Patented May 19, 1953

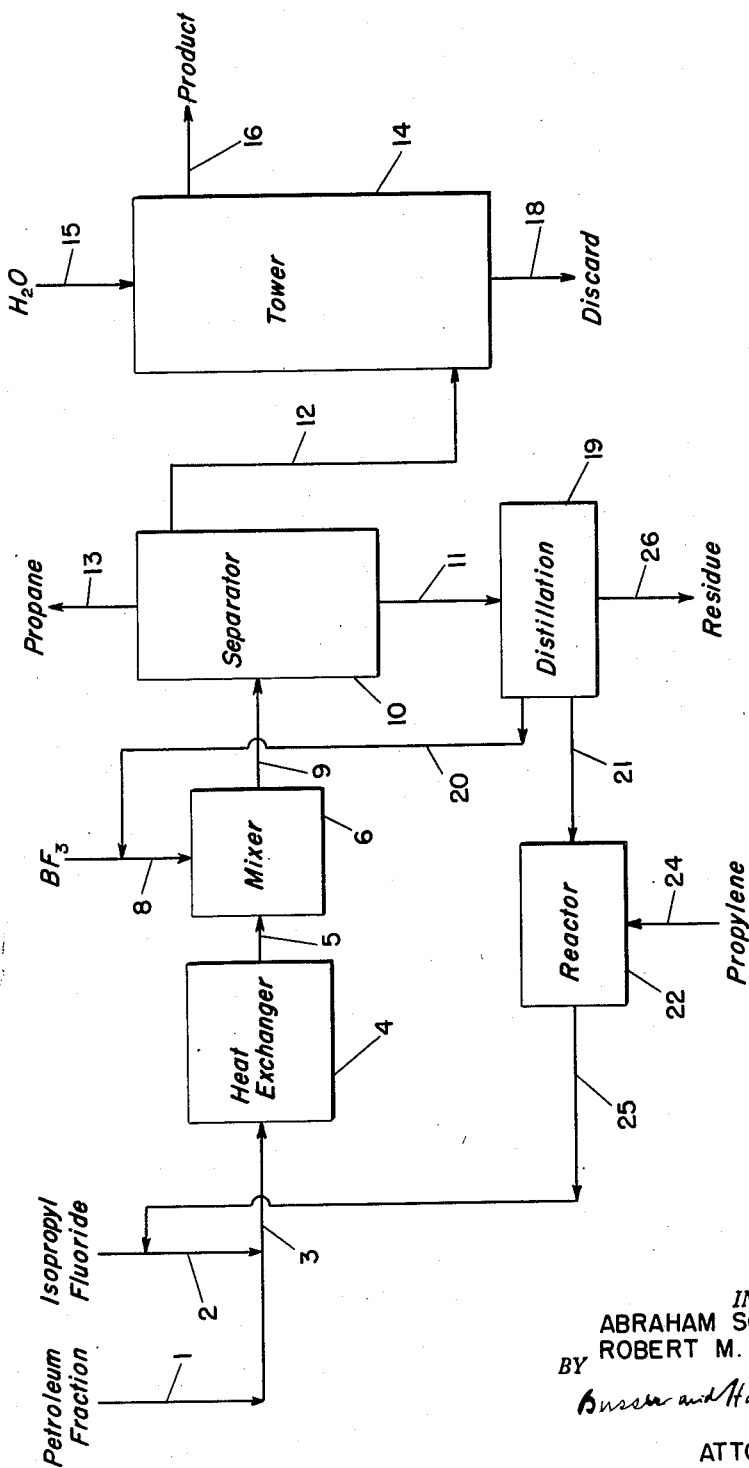

2,639,261

UNITED STATES PATENT OFFICE 2,639,261

HYDROCARBON PROCESS

Robert M. Kennedy, Newtown Square, and Abraham Schneider, Philadelphia, Pa., assignors to Sun Oil Company, Philadelphia, Pa., a corporation of New Jersey Application July 14, 1950, Serial No. 173,746

23 Claims. (Cl. 196—23)

This invention relates to the separation of hydrocarbons according to chemical type, and more specifically to a process for the separation of aromatic hydrocarbons from saturated non-aromatic hydrocarbons.

The separation of aromatic hydrocarbons from non-aromatic hydrocarbons, or an adjustment of the relative concentrations in a mixture thereof, is essential in order to prepare oils for special uses, such as electrical and lubricating oils. Methods heretofore used include, for example, treatment with solid contact material such as silica gel, or related absorbents. Such processes, however, are subject to certain disadvantages, including the difficulty in separating only a given quantity of aromatics to obtain a product having a predetermined aromatic concentration, and the difficulty of substantially completely separating aromatics when desired. Deactivation of the absorbent and the simultaneous separation of desired non-aromatic hydrocarbons, together with the aromatics, illustrate further difficulties of prior processes. Another process which has been described as useful in removing aromatics from non-aromatics is the contacting of a mixture thereof with hydrogen fluoride and boron fluoride. This process also suffers from disadvantages, such as the necessity for vigorous agitation to obtain mixing of the two phase system, and relatively large quantities of hydrogen fluoride are required to remove a substantial quantity of aromatics.

An object of the present invention is to provide a process for the removal of a desired quantity of aromatics from a mixture of hydrocarbons whereby a predetermined concentration of aromatics is permitted to remain in the resulting product. A further object is to provide a process for the removal of substantially all of the aromatics from a hydrocarbon mixture containing aromatic hydrocarbons and saturated non-aromatic hydrocarbons. Other objects appear hereinafter.

In copending application Serial No. 173,747, filed July 14, 1950, there is described and claimed a process for the separation of non-hydrocarbons from hydrocarbons which comprises bringing together boron fluoride and a tertiary alkyl fluoride in the presence of a mixture of non-hydrocarbons and hydrocarbons, whereby a sludge containing the non-hydrocarbons is formed and separates from the reaction mixture. In this process, if the quantity of alkyl fluoride used is in excess of the quantity required to remove the non-hydrocarbons, non-alkylatable aromatics are converted to and form a portion of the sludge, but only after substantially complete removal of the non-hydrocarbons.

In patent application Serial No. 173,748, filed July 14, 1950, there is described and claimed a process for separating non-alkylatable hydrocarbons from saturated non-aromatic hydrocarbons by bringing together boron fluoride and a tertiary alkyl fluoride in the presence of a mixture thereof, whereby the non-alkylatable aromatics are converted to and separate as a sludge.

In patent application Serial No. 173,745, filed July 14, 1950, there is described and claimed a process for the separation of non-hydrocarbons from hydrocarbons which comprises bringing together boron fluoride and a primary or secondary alkyl fluoride in the presence of a mixture thereof, whereby a sludge containing the non-hydrocarbons is formed. In this process, if the quantity of alkyl fluoride used is in excess of the quantity required to remove the non-hydrocarbons, the aromatics are converted to and form a portion of the sludge, but only after substantially complete removal of the non-hydrocarbons.

In patent application Serial No. 38,167, filed July 10, 1948, now Patent Number 2,557,113, there is described various reactions of hydrocarbons having at least one tertiary hydrogen atom per molecule such as alkylation, isomerization, and the like, using boron fluoride and an alkyl fluoride having at least two carbon atoms per molecule as the catalytic components to initiate such reactions, the process being conducted in the absence of aromatics.

In patent application Serial No. 130,926, filed December 3, 1949, there is described the alkylation of alkylatable aromatics with saturate hydrocarbons having at least five carbon atoms and one tertiary hydrogen atom per molecule by bringing together a tertiary alkyl fluoride and boron fluoride in the presence of a mixture thereof, the mole ratio of tertiary alkyl fluoride to aromatics plus saturates being from 1:20 to 3:5, and the mole ratio of saturates to aromatics being from 1:4 to 4:1.

It has now been discovered that by bringing together boron fluoride and a primary alkyl fluoride having at least two carbon atoms per molecule or a secondary alkyl fluoride in the presence of a mixture of saturated non-aromatic hydrocarbons and aromatic hydrocarbons, a catalytic condition is established which is effective to remove the aromatics, and that the amount of aromatics removed is substantially dependent upon the amount of alkyl fluoride employed.

The combination of the present catalytic agents, a primary or secondary alkyl fluoride and boron fluoride, has been found to be extremely potent and highly selective for the removal of aromatic hydrocarbons from an admixture thereof with saturated non-aromatic hydrocarbons such as paraffins, including branched chain paraffins, and cycloparaffins, including naphthenes. Only after substantially complete removal by sludge formation of aromatics do the reactions described in aforesaid patent application Serial No. 37,167 occur. The alkylation reactions described in aforesaid patent application Serial No. 130,926 do not occur with the present combination of refining agents. Thus, by proper adjustment of operating conditions, particularly the concentration of alkyl fluoride, as hereinafter described, all or a predetermined proportion of aromatics may be removed from a hydrocarbon mixture without any substantial loss of valuable non-aromatic hydrocarbons by sludge formation or degradation to undesired compounds.

Thus, in accordance with the present invention, when boron fluoride and a primary or secondary alkyl fluoride having at least two carbon atoms per molecule are brought together in the presence of aromatics and saturated non-aromatics, the aromatics are converted to and separate as an insoluble sludge, the amount of conversion being dependent upon the quantity of alkyl fluoride employed. Since alkylation reactions do not occur in the present process, both alkylatable and non-alkylatable aromatics are converted without distinction, the expression "non-alkylatable" being employed to indicate aromatics which are not alkylatable under alkylating conditions.

A substantial advantage of the present refining process is that both of the components of the catalytic combination are soluble in hydrocarbons, thus eliminating the necessity for the vigorous agitation in processes involving insoluble reagents, such as sulfuric acid, hydrogen fluoride and aluminum chloride. The present reaction mixture forms a homogeneous phase wherein reaction occurs and on completion of which the system becomes heterogeneous due to the formation of a sludge composed of undesirable constituents of the hydrocarbons. It is characteristic of the present process that the alkyl fluoride employed in the process is converted to the corresponding paraffin. For example, if isopropyl fluoride is employed, propane is formed therefrom and is a product of the reaction. A further advantage of the present process is the instantaneous nature of the present reaction, which occurs and is completed practically as soon as the catalytic components, an alkyl fluoride and boron fluoride, are brought together in the presence of the oil being treated. It follows that time is not a critical variable in the process, and no advantage is obtained by long periods of contact. For practical convenience, a contact time of from 1 to 40 minutes is suitable.

Aromatics which occur in petroleum and the various fractions obtainable therefrom, such as the gasoline, kerosene, and lubricating oil fractions, may be removed in part or in whole in accordance with the present process. Normally solid petroleum fractions may also be treated, in which case the temperature is maintained sufficiently high to keep the fraction in the liquid phase. Unsaturated non-aromatic hydrocarbons, such as olefins, should not be present in the reaction mixture to any substantial extent, and should constitute not more than 1% of the hydrocarbon charge. Non-hydrocarbons, i. e., organic compounds having as a constituent an element other than carbon or hydrogen, such as sulfur, oxygen, and nitrogen compounds, should not be present in the reaction mixture, and if initially present should be removed before subjecting the charge to the present process. In general, the non-hydrocarbon content of the charge should be less than 0.03%, since otherwise the reactions of aforesaid patent application Serial No. 173,745 occur.

As above described, the separation of aromatics from petroleum and the fractions and hydrocarbons obtainable therefrom are preferred embodiments of the present process, and the wide variety of aromatics, occurring in petroleum which are removable illustrates the versatility of the process. Aromatics occurring in petroleum which are readily removable in the present process, for example, include the substituted aromatics of the benzene, naphthalene, tetralin, anthracene, and phenanthrene series, although other aromatics, such as the unsubstituted homologues of the described aromatics, may be removed in the present process as above described. In general, the concentration of aromatics in the oil to be treated will not exceed about 50% by volume, and usually is within the range of from 1% to 30% by volume; concentrations of less than 1% may be advantageously removed in the present process when it is desired to substantially completely remove the aromatics.

By "petroleum hydrocarbons," as used herein, is meant those hydrocarbons which can be obtained from petroleum, and mixtures thereof; by "petroleum" is meant petroleum which has not been separated into fractions, and which therefore contains hydrocarbons having widely varying boiling points; and by "petroleum fractions," and "fraction," is meant a mixture of hydrocarbons obtained from petroleum having a relatively narrow boiling range. Hydrocarbons and mixtures thereof obtained from sources other than petroleum may be separated from aromatics. For example, hydrocarbon mixtures of aromatics and non-aromatics obtained from coal tar distillations may be employed in the process. Also, aromatics may be separated from a single saturated non-aromatic hydrocarbon in accordance with the present invention. By the term "oil," as used herein, is meant the hydrocarbons and mixtures thereof which may be refined in the present process, as above defined.

The alkyl fluorides which may be employed in the present process are the primary alkyl fluorides having at least two carbon atoms per molecule and secondary alkyl fluorides. By "primary" and "secondary" alkyl fluorides is meant those alkyl fluorides which have a fluorine atom attached to a primary or a secondary carbon atom, respectively.

As specific examples of primary fluorides which can be used in practicing the process, the following may be mentioned by way of illustration: ethyl fluoride; 1-fluoropropane; 1-fluorobutane; 1-fluoro-2-methylpropane; 1-fluoropentane; 1-fluoro-3-methylbutane; and similar derivatives of hexanes, heptanes, octanes, and the like. As specific illustrations of secondary fluorides, the following can be used: isopropyl fluoride; 2-fluorobutane; 2-fluoro-3-methylbutane; 2-fluoropentane; 3-fluoropentane; and 2-fluoro-3,3-dimethylbutane. It will be understood that the specific compounds named above are given merely by way of illustration and that any primary or secondary alkyl fluoride (with the exception of methyl fluoride) will produce an operative catalytic combination with BF₃ in accordance with the present invention.

In carrying out the process of the present invention, it is preferred to first dissolve the desired amount of alkyl fluoride in the oil, and then add the BF₃, such as by bubbling it into the solution. It is permissible, however, to simultaneously but separately introduce the refining agents, or to first dissolve BF₃ in the oil followed by addition of the alkyl fluoride. It is also permissible to dissolve the alkyl fluoride and BF₃ in separate portions of the oil and then admix the portions, thus bringing together the refining agents in the presence of the oil. It is not permissible to premix the alkyl fluoride and BF₃ since, in such case, the catalytic condition required to be exerted in the presence of the mixture of aromatics and non-aromatics being treated is immediately dissipated. By the expression "bringing together," and terms of similar import, as employed herein in conjunction with the use of the present refining agents, is meant the actual contacting thereof, which in the present process is always performed in the presence of the oil being treated, i. e., the present refining agents, alkyl fluoride and boron fluoride, are contacted only when they are also in contact with the oil being treated.

As above described, the quantity of aromatics removed is substantially dependent upon the quantity of alkyl fluoride employed. Accordingly, the concentration of alkyl fluoride required to obtain the desired reduction of aromatic content should be determined for each application, which can be readily accomplished in view of the present teachings. For example, it has been found that aromatic content of a petroleum lubricating oil fraction, initially about 23% by volume and composed substantially of non-alkylatable aromatics, is reduced about 20% by treatment of the fraction with 1% by weight of tertiary butyl fluoride, and is reduced about 50% by treatment with 2.3% by weight of the same fluoride, in both instances using an excess of boron fluoride, and the separation of such large amounts of aromatics with only small quantities of alkyl fluoride is considered a significant advantage of the present process. Equal molar quantities of the various alkyl fluorides within the scope of the present invention remove substantially the same quantity of aromatics from a given mixture. In general, from 0.5 to 20 weight percent of alkyl fluoride will be employed, although in some instances such as where it is desired to remove a large quantity of aromatics, as much as 30 weight percent may be used, so long as the amount used is not in excess of the amount required to remove all of the aromatics.

As above stated, the concentration of boron fluoride to employ is not critical, the requirement being that a quantity sufficient to establish the necessary catalytic condition be employed. In general, from 0.1 to 400 weight percent, and preferably from 0.3 to 200 weight percent, based on the weight of alkyl fluoride employed, is sufficient to cause completion of the present process to the desired extent, which, as above described, is substantially determined by the quantity of the alkyl fluoride employed.

The present reaction is conducted in the liquid phase. Super-atmospheric pressure is preferred so that the desired amount of boron fluoride readily dissolves in the reaction mixture. Pressures of from atmospheric to 500 p. s. i., depending on the concentration of boron fluoride desired, is suitable in most instances.

The operable temperature range varies considerably and depends largely on the particular material being treated. A temperature sufficiently high to maintain the hydrocarbons in a fluid, i. e., non-viscous, state is preferred. In general, temperatures of from 20° C. to 150° C. are employed. If it is desired to operate at lower temperatures the lowest temperature at which the secondary fluorides can be employed is —90° C. and the lowest temperature at which primary fluorides can be employed is —10° C. An exception is ethyl fluoride, which has been found to be somewhat more inert than the alkyl fluorides having 3 or more carbon atoms per molecule, and which requires a temperature of above about 20° C. to be operable in the present process.

As above described, the refining agents are soluble in the present oils, and on completion of the reaction, which is practically instantaneous, a sludge separates to form a heterogeneous phase. As already described, only insignificant amounts of non-aromatic hydrocarbons are converted to sludge. The sludge may be separated by any convenient or desired means, such as by filtering, centrifuging, or decanting. The oil, after sludge removal, is advantageously washed with water or an aqueous solution of an alkali, such as sodium hydroxide, or it may be treated with ammonia. The refined product is obtained by separating the heterogeneous phase of this last treatment, and is preferably dried if necessary or desirable. Treatment of the oil with clay, such as is usually required after sulfuric acid refining, is not required, but of course may be employed if desired, as may other process steps known to the art.

Boron fluoride and hydrogen fluoride are easily recoverable from the separated sludge by heating or applying a vacuum, or both. For example, heating to about 190° C. under slight vacuum drives off hydrogen fluoride and boron fluoride, which may be recovered, the boron fluoride being re-cycled to the system and the hydrogen fluoride being used to prepare additional alkyl fluoride, such as by addition reaction with an appropriate olefin, as known to the art, the resulting alkyl fluoride being then employed in the process. The product remaining after removal of the boron fluoride and hydrogen fluoride may be employed as fuel or as a component of compositions useful, for example, in paving roads and the like.

Attention is now directed to the accompanying flow diagram which illustrates an embodiment of the present invention, and is directed to the separation of aromatic hydrocarbons from saturated non-aromatic hydrocarbons contained in a saturate petroleum fraction. The mixture of hydrocarbons to be treated, such as a petroleum lubricating oil fraction, is introduced into the process through line 1 and isopropyl fluoride, used to illustrate the various alkyl fluorides which may be employed, is introduced into the system through line 2. A mixture of the petroleum fraction and isopropyl fluoride passes through line 3 into heat exchanger 4 wherein the temperature of the mixture is adjusted to the desired value, usually from 20° C. to 150° C. The mixture then passes through line 5 into mixer 6, into which the BF₃ is introduced through line 8. Means to provide mild agitation in mixer 6 may be supplied if desired, but may be omitted if the turbulence of flow is sufficient to secure substantially uniform mixing. On introduction of the BF₃, reaction begins and proceeds rapidly to completion with formation of a sludge composed largely of aromatic components of the petroleum fraction. The sludge-containing fraction passes through line 9 into separator 10, sludge being removed therefrom through line 11 and the refined fraction through line 12. Propane formed from the isopropyl fluoride is removed from the separator through line 13. The refined fraction passes into tower 14 wherein it is treated to remove any entrained acid gases such as by washing with water, the water being introduced into tower 14 through line 15. Refined product is removed through 16 and the used water through line 18. The refined product may be dried and further treated as desired. Sludge from separator 10 passes through line 11 into distillation zone 19, and BF₃ and HF are evolved therefrom. BF₃ is recycled to the process through lines 20 and 8. HF passes through line 21 into reactor 22 wherein it is reacted with propylene supplied through line 24 to form isopropyl fluoride, which is introduced into the process through lines 25 and 2. Residue from distillation zone 19 is removed through line 26 and may be employed as fuel or as a component of compositions useful, for example, in paving roads and the like.

The quantity of reactants to employ and the various operating conditons are advantageously maintained as hereinbefore described:

The following example illustrates the process of the present invention:

A light kerosene fraction was treated with silica gel to remove a portion of the aromatics and substantially all of the non-hydrocarbons. One hundred parts by weight of the treated fraction containing 1 volume per cent aromatics were admixed with 2.5 parts by weight of t-butyl fluoride. Nine parts by weight of boron fluoride were added; the pressure was 120 p. s. i. and the temperature 23° C. A small amount of sludge, about 4 parts by weight, formed and was separated by decanting. The quantity of aromatics remaining in the product was less than 0.2 volume percent. The product exhibited improved color, color stability, and anti-sludging properties.

When a primary or secondary alkyl fluoride having at least 2 carbon atoms per molecule is employed in place of t-butyl fluoride, results substantially identical thereto are obtained.

Modifications in the described procedure will be apparent to those skilled in the art; the present process may be adapted to batch or continuous operation.

The separation of non-hydrocarbons, either alone or together with aromatics is not within the scope of the present claims, but is claimed in aforesaid patent application Serial No. 173,745, filed July 14, 1950.

The invention claimed is:

1. Process of treating hydrocarbons to separate aromatic hydrocarbons from a mixture thereof with saturated non-aromatic hydrocarbons which comprises reacting a mixture of aromatic hydrocarbons and saturated non-aromatic hydrocarbons with boron fluoride and an alkyl mono-fluoride selected from the group consisting of primary alkyl mono-fluorides having at least two carbon atoms per molecule and secondary alkyl mono-fluorides as the sole refining agents, said boron fluoride and said alkyl mono-fluoride being brought together only in the presence of said mixture of aromatic hydrocarbons and saturated non-aromatic hydrocarbons, whereby aromatic hydrocarbons are converted to a sludge, and separating said sludge from the reaction mixture.

2. Process for separating aromatic hydrocarbons from a petroluem fraction containing the same and saturated non-aromatic hydrocarbons which comprises reacting a petroleum fraction containing aromatic hydrocarbons with boron fluoride and an alkyl mono-fluoride selected from the group consisting of primary alkyl mono-fluorides having at least two carbon atoms per molecule and secondary alkyl mono-fluorides as the sole refining agents, said boron fluoride and said alkyl mono-fluoride being brought together only in the presence of said petroleum fraction, whereby aromatic hydrocarbons are converted to an insoluble sludge, and wherein the quality of alkyl mono-fluoride employed is not in excess of the amount required to convert all of said aromatic hydrocarbons to sludge, and separating said sludge from the reaction mixture.

3. Process according to claim 2 wherein the alkyl fluoride is a primary alkyl fluoride having at least two carbon atoms per molecule.

4. Process according to claim 2 wherein the alkyl fluoride is 1-fluoro-3-methylbutane.

5. Process according to claim 2 wherein the alkyl fluoride is a secondary alkyl fluoride.

6. Process according to claim 2 wherein the alkyl fluoride is isopropyl fluoride.

7. Process according to claim 2 wherein the alkyl fluoride is 2-fluorobutane.

8. Process according to claim 2 wherein the alkyl fluoride is 2-fluoropentane.

9. Process according to claim 2 wherein the alkyl fluoride is 2-fluoro-3,3-dimethylbutane.

10. Process for separating aromatic hydrocarbons from a lubricating oil fraction comprising aromatic hydrocarbons and saturated non-aromatic hydrocarbons which comprises reacting said lubricating oil fraction with boron fluoride and an alkyl mono-fluoride selected from the group consisting of primary alkyl mono-fluorides having at least two carbon atoms per molecule and secondary alkyl mono-fluorides as the sole refining agents, said boron fluoride and said alkyl mono-fluoride being brought together only in the presence of said lubricating oil fraction, and wherein the quantity of alkyl mono-fluoride employed is not in excess of the amount required to convert all of said aromatic hydrocarbons to sludge, and separating said sludge from the reaction mixture.

11. Process according to claim 10 wherein the alkyl fluoride is a primary alkyl fluoride.

12. Process according to claim 10 wherein the alkyl fluoride is a secondary alkyl fluoride.

13. Process according to claim 10 wherein the alkyl fluoride is isopropyl fluoride.

14. Process for separating aromatic hydrocarbons from a kerosene fraction comprising aromatic hydrocarbons and saturated non-aromatic hydrocarbons which comprises reacting said kerosene fraction with boron fluoride and an alkyl mono-fluoride selected from the group consisting of primary alkyl mono-fluorides having at least two carbon atoms per molecule and secondary alkyl mono-fluorides as the sole refining agents, said boron fluoride and said alkyl mono-fluoride being brought together only in the presence of said kerosene fraction, and wherein the quantity of alkyl mono-fluoride employed is not in excess of the amount required to convert all of said aromatic hydrocarbons to sludge, and separating said sludge from the reaction mixture.

15. Process according to claim 14 wherein the alkyl fluoride is a primary alkyl fluoride.

16. Process according to claim 14 wherein the alkyl fluoride is isopropyl fluoride.

17. Process according to claim 14 wherein the alkyl fluoride is a secondary alkyl fluoride.

18. Process for separating aromatic hydrocarbons from a gasoline fraction comprising aromatic hydrocarbons and saturated non-aromatic hydrocarbons which comprises reacting said gasoline fraction with boron fluoride and an alkyl mono-fluoride selected from the group consisting of primary alkyl mono-fluorides having at least two carbon atoms per molecule and secondary alkyl mono-fluorides as the sole refining agents, said boron fluoride and said alkyl mono-fluoride being brought together only in the presence of said gasoline fraction, and wherein the quantity of alkyl mono-fluoride employed is not in excess of the amount required to convert all of said aromatic hydrocarbons to sludge, and separating said sludge from the reaction mixture.

19. Process according to claim 18 wherein the alkyl fluoride is a primary alkyl fluoride.

20. Process according to claim 18 wherein the alkyl fluoride is a secondary alkyl fluoride.

21. Process according to claim 18 wherein the alkyl fluoride is isopropyl fluoride.

22. Process of treating a mixture of aromatic and non-aromatic hydrocarbons to obtain a product having a predetermined concentration of aromatic hydrocarbons less than the concentration thereof in said mixture which comprises reacting said mixture of aromatic and saturated non-aromatic hydrocarbons with boron fluoride and a predetermined quantity of an alkyl mono-fluoride selected from the group consisting of primary alkyl mono-fluorides having at least two carbon atoms per molecule and secondary alkyl mono-fluorides as the sole treating agents, said boron fluoride and said alkyl mono-fluoride being brought together only in the presence of said mixture of aromatic and saturated non-aromatic hydrocarbons, whereby a portion of said aromatic hydrocarbons is converted to an insoluble sludge, and separating a mixture of aromatic and saturated non-aromatic hydrocarbons having a predetermined concentration of aromatic hydrocarbons from the reaction mixture.

23. Process for separating aromatic hydrocarbons from a lubricating oil fraction comprising aromatic hydrocarbons and saturated non-aromatic hydrocarbons which comprises reacting said fraction with boron fluoride and isopropyl fluoride as the sole refining agents, said boron fluoride and said isopropyl fluoride being brought together only in the presence of said fraction, whereby aromatic hydrocarbons are converted to an insoluble sludge and said isopropyl fluoride is converted to propane, and wherein the quantity of isopropyl fluoride employed is not in excess of the amount required to convert all of said aromatic hydrocarbons to sludge, and separating sludge and propane from the reaction mixture.

ROBERT M. KENNEDY.
ABRAHAM SCHNEIDER.

References Cited in the file of this patent

UNITED STATES PATENTS

| Number | Name | Date |
|---|---|---|
| 2,162,682 | Terres | June 13, 1939 |
| 2,267,730 | Grosse et al. | Dec. 30, 1941 |
| 2,343,744 | Burk | Mar. 7, 1944 |
| 2,343,841 | Burk | Mar. 7, 1944 |
| 2,357,495 | Bloch | Sept. 5, 1944 |
| 2,378,762 | Frey | June 19, 1945 |
| 2,408,173 | Matuszak | Sept. 24, 1946 |
| 2,472,908 | Linn | June 14, 1949 |
| 2,507,599 | Cade | May 16, 1950 |